United States Patent

Koshiyama et al.

[11] Patent Number: 6,021,246
[45] Date of Patent: Feb. 1, 2000

[54] CLOSURE FOR CABLE CONNECTION

[75] Inventors: Koji Koshiyama, Tokyo; Kinji Mineshima, Saitama; Tatsuro Oikawa, Tokyo; Tetsuya Hoshijima, Yamaguchi; Toshiyuki Ishikawa; Mitsuo Kama, both of Ibaraki; Yoshiyuki Yoshii, Chiba, all of Japan

[73] Assignees: Japan Recom Ltd; Nippon Telegraph; Telephone Corporation, all of, Japan

[21] Appl. No.: 09/085,412

[22] Filed: May 27, 1998

[30] Foreign Application Priority Data

Jun. 3, 1997 [JP] Japan ................................. 9-159274

[51] Int. Cl.[7] ...................................................... G02B 6/00
[52] U.S. Cl. ............................................................ 385/134
[58] Field of Search ..................................... 385/132–135, 385/136, 137, 141, 147; 439/138, 142, 606; 174/92, 84 R, 138 F, 77 R, 93

[56] References Cited

U.S. PATENT DOCUMENTS

| | | | |
|---|---|---|---|
| 3,555,171 | 1/1971 | Larson | 174/138 F |
| 4,731,271 | 3/1988 | Heucke et al. | 174/92 |
| 5,606,149 | 2/1997 | Yaworski et al. | 174/92 |
| 5,669,776 | 9/1997 | Moody et al. | 439/138 |
| 5,760,375 | 6/1998 | Hall | 492/46 |
| 5,850,499 | 12/1998 | Sasaki et al. | 385/135 |

*Primary Examiner*—Akm E. Ullah
*Attorney, Agent, or Firm*—Lerner, David, Littenberg, Krumholz & Mentlik, LLP

[57] ABSTRACT

A closure for a cable connection capable of facilitating access to fiber connection sections, ensuring simplified management, assembling and disassembling, and exhibiting increased sealing and resealing characteristics. A base member is formed at a portion of an outer surface thereof positioned around each of cable insertion holes with a cylindrical pocket, in which a cable bush made of a rubber-like elastic material and formed with a through-hole communicating with a respective one of the cable insertion holes is fittedly arranged. A cable seal cap which has a raised surface for abutting against the cable bush is releasably fitted in the cylindrical pocket to bring the cable bush into elastic contact with a cable.

19 Claims, 7 Drawing Sheets

CLOSURE FOR CABLE CONNECTION

BACKGROUND OF THE INVENTION

This invention relates to a closure for a cable connection adapted to be arranged in a hand hole, a shallow access hole of a smaller size (a so-called fingerhole) or the like, and more particularly to a closure suitable for connection of optical fiber cables including optical fibers and tension members to fiber connection sections or for branch connection of optical fiber cables. In particular, the present invention is concerned with a closure for a cable connection which is adapted to receive fiber connection sections of optical fiber cables in a casing body of the closure while securely holding the optical fiber cables including tension members therein and facilitate access to the fiber connection sections.

In general, connection between cables such as optical fiber cables is carried out by connecting or splicing optical fibers of the cables to each other by means of connectors and protecting the connectors in a closure. Such a closure, particularly, a closure for connection of underground cables is required to meet requirements contrary to each other. More particularly, the closure is required to exhibit fluid tightness or sealing characteristics sufficient to prevent intrusion of water or the like into the closure and facilitate access to fiber connection sections of cables. Thus, a conventional closure for a cable connection, in order to ensure both satisfactory sealing characteristics and connection workability, employs either a casing structure constructed of two casing halves joined to each other through a seal member by means of screws or a casing structure wherein a casing is formed with an opening for access to the fiber connection sections and the opening is closed with a lid through a seal member by means of screws.

Unfortunately, the conventional closure renders connection between short excess fibers in a hand hole or the like troublesome when branch or drop connection between optical fiber cables previously laid is required, resulting in being obliged to employ an intermediate post-branch procedure wherein after cutting of all fibers of a cable, required branch and drop cables are connected and taken out and the remaining fibers are re-connected. Unfortunately, this needs management for identification of the fibers and an additional connection operation. Also, access to the fiber connection sections requires troublesome removal and remounting of tension members. Further, branch and lead-in connection of optical fiber cables and maintaining of the branch and lead-in connection at increased reliability necessarily require both repeating of the connection and repairing of the branch and lead-in connection. Furthermore, the conventional closure renders sealing of the closure against an ambient environment troublesome and renders both replacement and increase of the fibers difficult. In addition, in order to ensure safety of fiber connection sections and improved workability for cables of different diameters, the conventional closure is complicated in structure and increased in cost. In particular, the conventional closure fails to be commonly applied to various connection procedures such as a full-fiber connection procedure, an post-branch connection procedure, a conversion fiber connection procedure and a drop cable connection procedure and the like. Moreover, the conventional closure, when it is arranged in a hand hole or a so-called finger-hole, deteriorates workability in a cable connection operation because it needs tools for connection.

SUMMARY OF THE INVENTION

The present invention has been made in view of the foregoing disadvantages of the prior art.

Accordingly, it is an object of the present invention to provide a closure for a cable connection which is capable of being commonly applied to various cable connection procedures.

It is another object of the present invention to provide a closure for a cable connection which is capable of ensuring satisfactory cable connection irrespective of a diameter of cables to be treated while exhibiting increased workability.

It is a further object of the present invention to provide a closure for a cable connection which is capable of facilitating access to fiber connection sections of cables.

It is still another object of the present invention to provide a closure for a cable connection which is capable of exhibiting increased sealing characteristics against an ambient environment and facilitating both assembling and disassembling thereof.

It is yet another object of the present invention to provide a closure for a cable connection which is capable of receiving optical fibers with increased packing density therein.

In accordance with the present invention, a closure for a cable connection is provided. The closure generally includes a closure casing including a base member formed with a plurality of cable insertion holes, a cap-like cover member constructed so as to be open at one end thereof and fitted on the base member through the one end thereof, and a fastener for detachably fastening the cover member to the base member, as well as at least one fiber storage unit provided in the closure casing for receiving cable connection sections and excess fibers therein. In the closure thus generally constructed, the base member is formed at a portion of an outer surface thereof positioned around each of the cable insertion holes with a cylindrical pocket, in which a cable bush made of a rubber-like elastic material and formed with a through-hole communicating with a respective one of the cable insertion holes is fittedly arranged, and a cable seal cap which has a raised surface for abutting against the cable bush is releasably fitted in the cylindrical pocket to bring the cable bush into elastic contact with a cable.

In a preferred embodiment of the present invention, the cable bush is formed of a thermoplastic rubber-like composition, selected from rubber and elastomer, of 0 to 60 Hs in hardness.

In a preferred embodiment of the present invention, the cable bush is disposed along with a spacer formed with a cable insertion aperture while the spacer is interposedly provided on at least one of opposite surfaces of the cable bush.

In a preferred embodiment of the present invention, the cable insertion holes of the base member are each closed with a cap through a connection of a small thickness removably connected between the base member and the cap and the cap is provided with a fit connection recess which permits a removal operation member to be fittedly inserted therein so as to remove the cap to open the cable insertion hole.

In a preferred embodiment of the present invention, the cable bush is fitted in the cylindrical pocket while keeping the cable inserted through the through-hole and a seal tape of 0 to 30 Hs in hardness is multiplexly wound on a portion of the cable fitted in the through-hole.

In a preferred embodiment of the present invention, the pocket is formed by an outer cylindrical wall provided on an outer surface of the base member so as to outwardly project therefrom.

In a preferred embodiment of the present invention, the cable bush is formed with a plurality of the through-holes.

Also, in accordance with the present invention, a closure for a cable connection is provided. The closure includes a closure casing including a base member formed with a plurality of cable insertion holes, a cap-like cover member constructed so as to be open at one end thereof and fitted on the base member through the one end thereof, and a fastener for detachably fastening the cover member to the base member, as well as at least one fiber storage unit provided in the closure casing for receiving fiber connection sections and excess fibers therein. In the closure, the cable insertion holes of the base members are each provided therein with a cable seal means, the cable insertion holes of the base member are each closed with a cap through a connection of a small thickness removably connected between the base member and the cap, and the cap is provided with an engagement with which a removal operation member is permitted to be engaged so as to remove the cap to open the cable insertion hole.

In a preferred embodiment of the present invention, the cable seal means includes a cylindrical pocket formed on an outer surface of the base member to be positioned around each of the cable insertion holes, a cable bush of a rubber-like elastic material fitted in the cylindrical pocket and formed with a through-hole communicating with a respective one of the cable insertion holes, and a cable seal cap having a raised surface abutting against the cable bush, and the seal cap is detachably fitted in the cylindrical pocket to bring the cable bush into elastic contact with a cable.

In a preferred embodiment of the present invention, the engagement is a recess which is formed in the cap and which permits the removable operation member to be fittedly inserted therein.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a closure for a cable connection according to the present invention will be described hereinafter with reference to the accompanying drawings.

Figure 2:
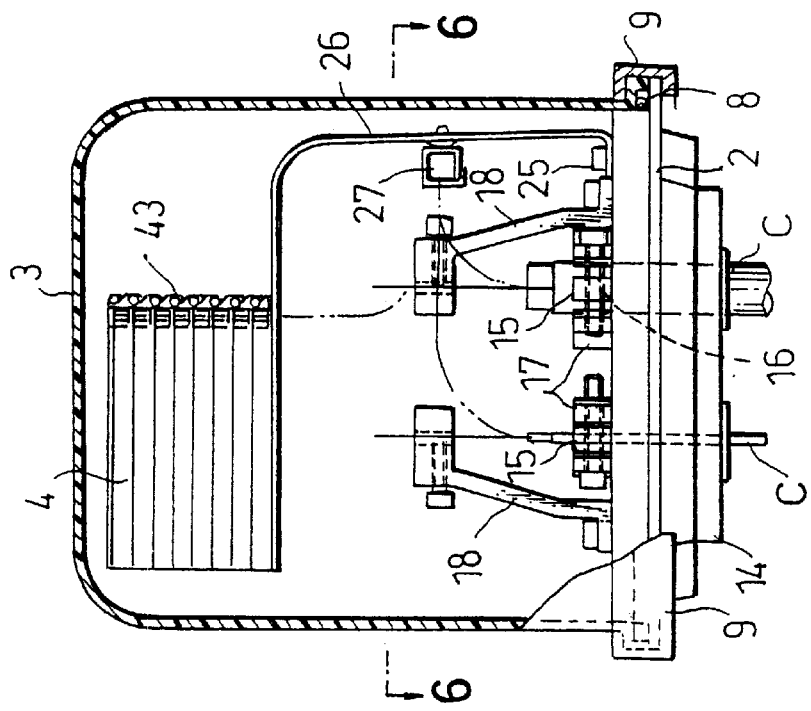
FIG. 2 is a side elevation view partly in section of the closure shown in FIG. 1.
Figure 1:
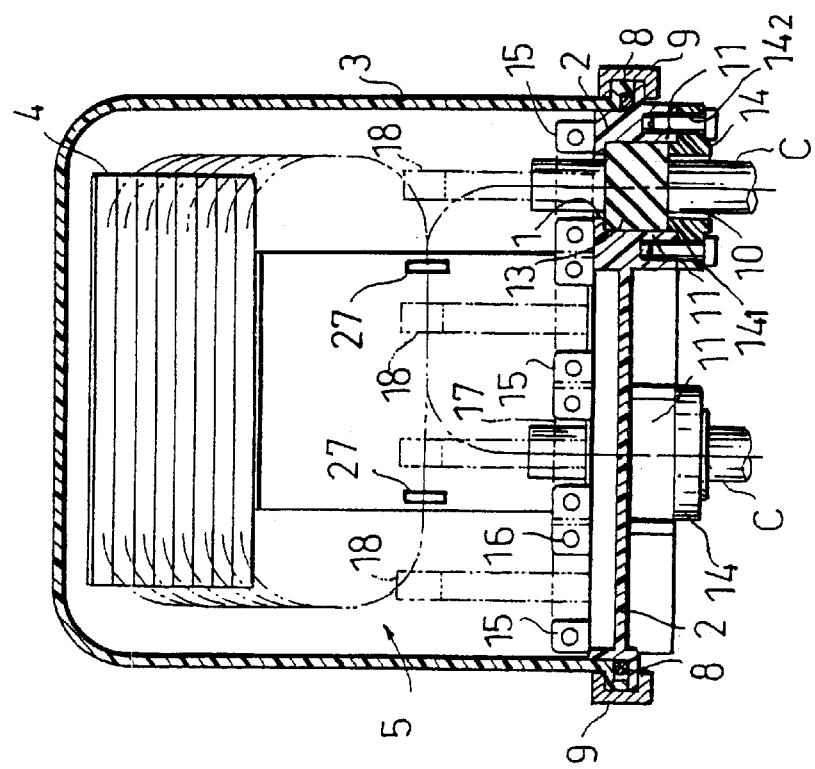
FIG. 1 is a vertical sectional view showing an embodiment of a closure for a cable connection according to the present invention.
Figure 3:
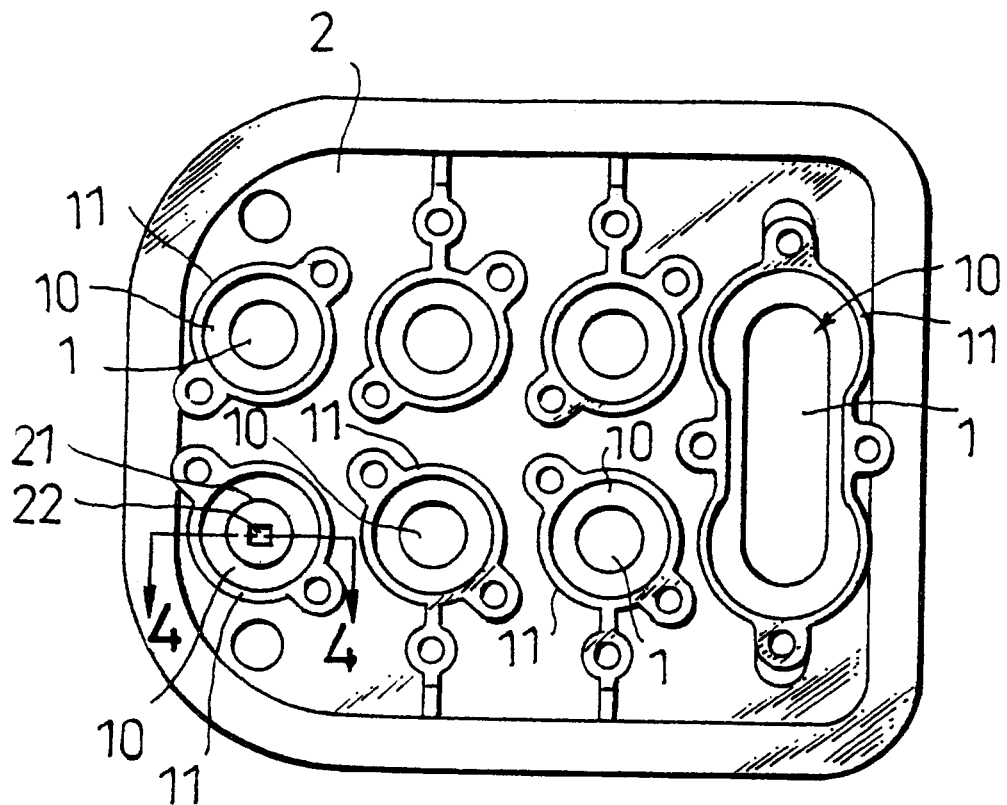
FIG. 3 is a bottom view showing a base member incorporated in the closure shown in FIG. 1.

Referring first to FIGS. 1 to 9B, an embodiment of a closure for a cable connection according to the present invention is illustrated. A closure of the illustrated embodiment, as shown in FIGS. 1 to 3, includes a closure casing constituted by a base member 2 formed with a plurality of cable insertion holes 1, a cap-like cover member 3 open at one end or a lower end thereof and fitted on the base member 2 through the open one end, and a fastener 9 for detachably fastening the cover member 3 to the base member 2. The closure casing is provided therein with at least one fiber storage unit 4 for receiving a plurality of fiber connection sections and excess fibers therein and/or a reservation or retention fiber receiving section 5. The base member 2 acting as an end plate of the closure is formed at portions of an outer surface thereof positioned around the cable insertion holes 1 with respective cylindrical pockets 10. The cylindrical pockets 10 are each formed by a cylindrical wall 11 provided on the outer surface of the base member 2 and are each fitted therein with a cable bush 13. The cable bush 13 is made of a rubber-like elastic material and formed with at least one through-hole 12 communicating with a corresponding one of the cable insertion holes 1. The cylindrical pocket 10 is releasably fitted therein with a cable seal cap 14 which has a raised. surface $14_1$ for abutting against the cable bush 13 and functions to bring the cable bush 13 into elastic contact with a cable C. Also, the base member 2 is provided on an inner surface thereof with a plurality of holders 15 in pairs in a manner to be opposite to each other while interposing the cable insertion holes 1 therebetween. The holders 15 are each constituted by, for example, a bracket. Each pair of the holders 15 have cable clamps 17 detachably and retractably mounted thereon by means of mounting screws 16, to thereby interposedly pressedly hold the cable C between the cable clamps 7. The cable clamps 17 are each formed on opposite sides thereof with arcuate surfaces or recessed surfaces in conformity to the cable C depending on a diameter of the cable C. Also, tension member clamps 18 which are constructed so as to mount thereon respective tension members by means of screws are arranged on the inner surface of the base member 2. The base member 2 is formed on an outer peripheral surface thereof with an annular fit section, through which the cover member 3 is fitted on the base member 2 while arranging a ring-like gasket 8 around the annular fit section in a manner to be interposed between the cover member 3 and the base member 2. Further, the closure of the illustrated embodiment includes a detachable fastening band 9 for fastening the cover member 3 to the base member 2.

The cable insertion holes 1 include one cable insertion hole common to a lead-in cable and a lead-out cable, and a plurality of cable insertion holes each for a predetermined number of drop cables. The holders 15 of the base member 2 arranged around each of the cable insertion holes 1, as described above, have the cable clamp 17 tightly mounted thereon by means of the mounting screw 16 to keep the cable C securely inserted through the cable insertion hole 1.

The band 9 fitted on the outer peripheral surface of the cover member 3 and the base member 2 includes a hinge (not shown) for opening and closing and a buckle (not shown) for tightening so as to connect the base member 2 and cover member 3 to each other through the gasket 8.

The cable bush 13 fitted in each of the cylindrical pockets 10 of the base member 2 is made of a thermoplastic rubber-like composition of 0 to 60 Hs in hardness such as rubber or elastomer and formed with a cylindrical shape. The cable bushes 13 are each formed at a central portion thereof with the through-hole or through-holes 12, and may be used with a spacer 19 formed with a cable insertion aperture or apertures $19_1$ while the spacer 19 is interposedly provided on one or both of the opposite surfaces of the cable bush 13, as required.

Figure 4:
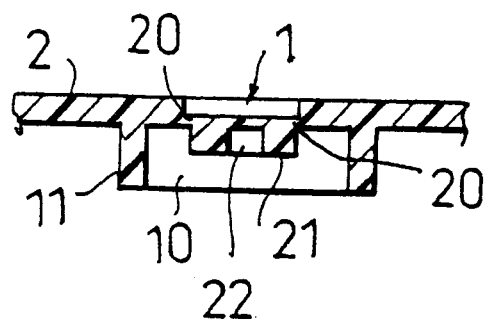
FIG. 4 is an enlarged vertical sectional view taken along line 4—4 of FIG. 3.
Figure 5:
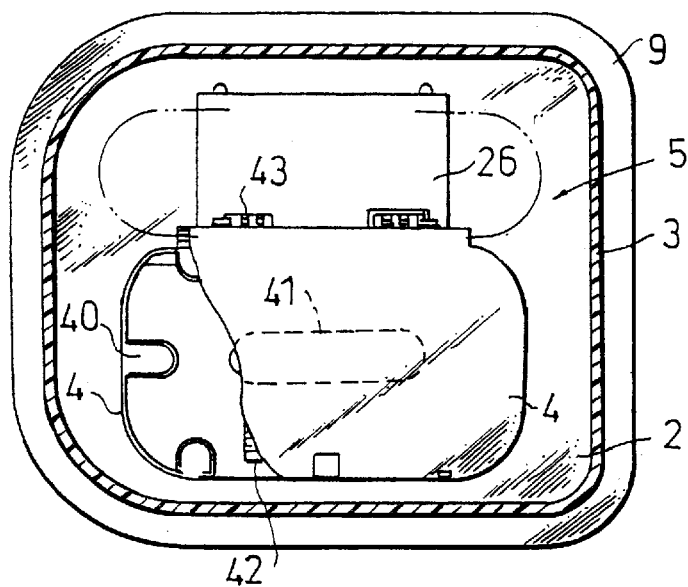
FIG. 5 is a plan view partly in section of the closure shown in FIG. 1.
Figure 6:
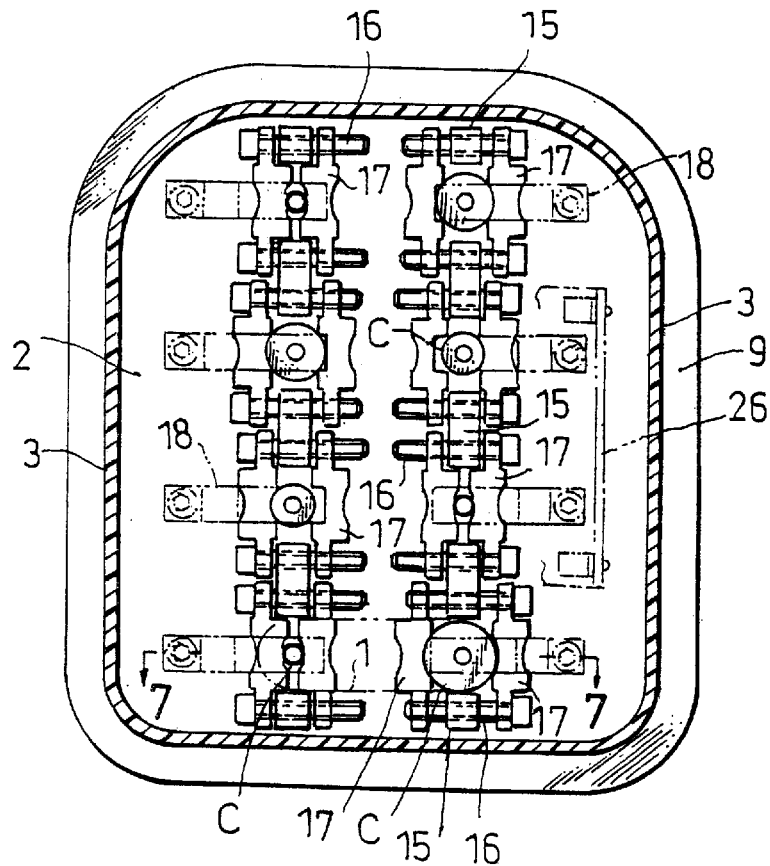
FIG. 6 is an enlarged sectional plan view taken along line 6—6 of FIG. 2.
Figure 7:
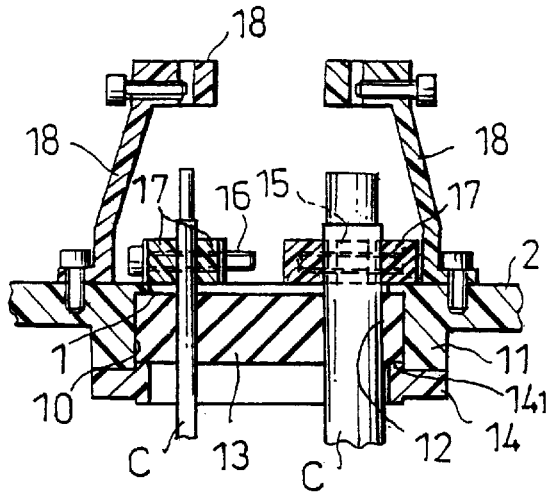
FIG. 7 is a vertical sectional view taken along line 7—7 of FIG. 6.
Figure 8A:
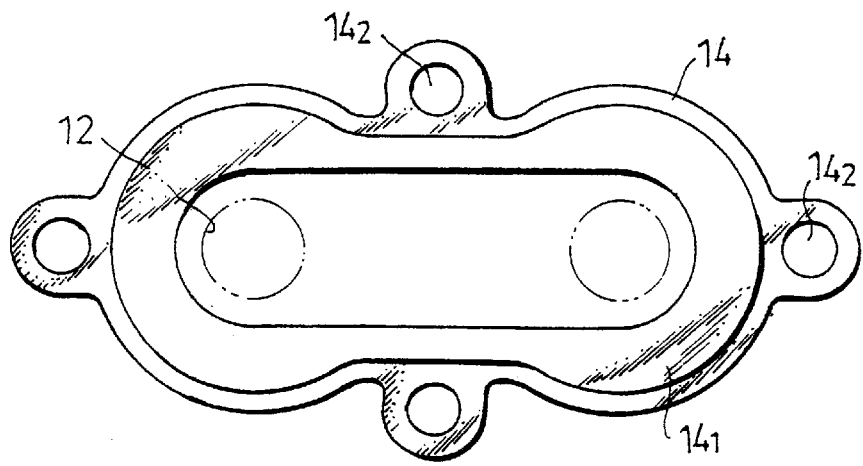
FIG. 8A is a plan view showing a main-cable cap incorporated in the closure shown in FIG. 1.
Figure 8B:
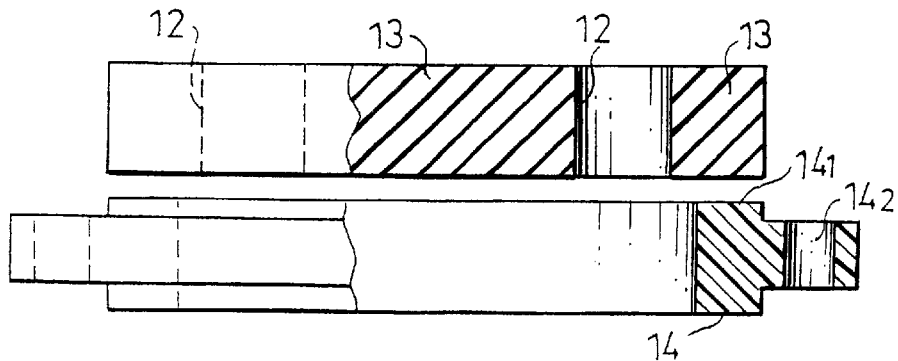
FIG. 8B is a partly sectional side elevation view showing the main-cable cap of FIG. 8A and a seal member, which are in a separated state.
Figure 9A:
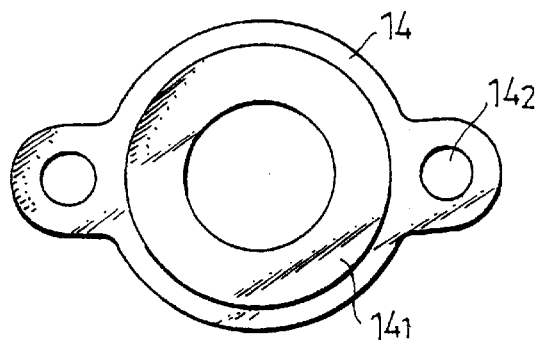
FIG. 9A is a plan view showing a branch-cable cap incorporated in the closure shown in FIG. 1.
Figure 9B:
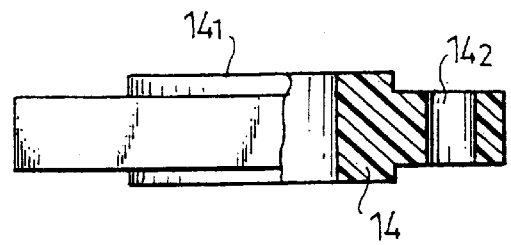
FIG. 9B is a partly sectional side elevation view of the branch-cable cap shown in FIG. 9A.

The cable insertion holes 1 are each closed with a cap 21 connected there to the base member 2 through a removable connection 20 of a small thickness interposedly arranged or connected therebetween, as shown in FIG. 4. The caps 21 are each formed with a fit connection recess 22, in which a removal operation member such as a bar or the like is inserted to remove the cap 21 to open the cable insertion hole 1, to thereby increase drop cables to be lead-out.

Each pair of the cable clamps 17 are so constructed that a holding interval defined therebetween is adjusted by the mounting screws 16 depending on an outer diameter of the cable C. In this instance, the cable bush 13 having the same diameter as the cable C to be treated may be selected. Alternatively, a seal tape 24 of 0 to 30 Hs in hardness is multiplexly wound on an outer periphery of the cable C and a portion of the cable C on which the tape 24 is wound is inserted through the though-hole 12 of the cable bush 13, and then the cable bush 13 is fitted in the cylindrical pocket 10.

A support 26 is mounted on the inner surface of the base member 2 through mounting members 25. The support 26 is provided thereon with fiber guides 27, so that a plurality of the fiber storage units 4 are detachably and pivotally supported on the support 26. The fiber storage units 4 are each in the form of a flat casing including fiber holding elements 40, an excess fiber winding-up section 41, a connector receiving section 42 for receiving fiber connection sections, such as, for example, a fiber ribbon connection section, a single-fiber connection section and/or a conversion fiber separation receiving section. The fiber storage units 4 are each supported on the support 26 through a hinge 43 in a manner to be detachable and pivotable, for example, within an angle of 90 degrees. The fiber storage units 4 are arranged in a manner to be stacked up on each other in the cover member 3 while being kept from being undesirably apart from one another by holders.

The fiber storage units 4 may each be provided therein with the excess fiber receiving section and fiber connection receiving section. Alternatively, it may include the excess fiber winding-up section, fiber ribbon connection receiving section, conversion fiber separation receiving section and single-fiber connection receiving section depending on a fiber connection procedure or techniques to be employed. This permits the closure to facilitate receiving of optical fibers, ensures satisfactory connection and layout of drop cables, and facilitates management of optical fibers such as identification thereof.

Figure 10A:
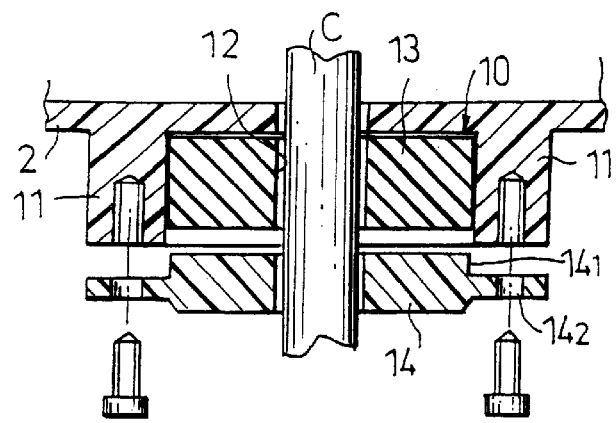
FIG. 10A is an exploded vertical sectional view showing a manner of operation of an essential part of the closure shown in FIG. 1, which is applied to a cable of a large diameter.

For example, under circumstances that both internal and external pressures of the closure are low, when the cable seal cap 14 is fitted in the cylindrical pocket 10 using the cable bush 13 made of soft rubber having a hardness as small as 0 to 30 Hs as shown in FIG. 10A, the raised surface $14_1$ of the cable seal cap 14 is permitted the cable bush 13 to be effectively pressed in the pocket 10, so that the cable bush 13 may be deformed to laterally expand toward the cable C in the through-hole 12. In this instance, selection of a suitable cable bush 13 can eliminate arrangement of any spacer.

Figure 10B:
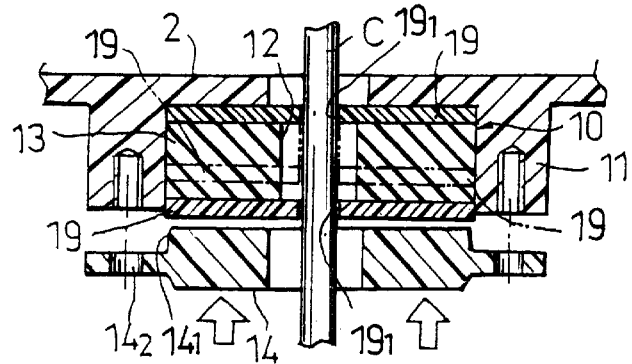
FIG. 10B is an exploded vertical sectional view showing another manner of operation of the essential part of the closure shown in FIG. 1, which is applied to a cable of a small diameter.
Figure 11:
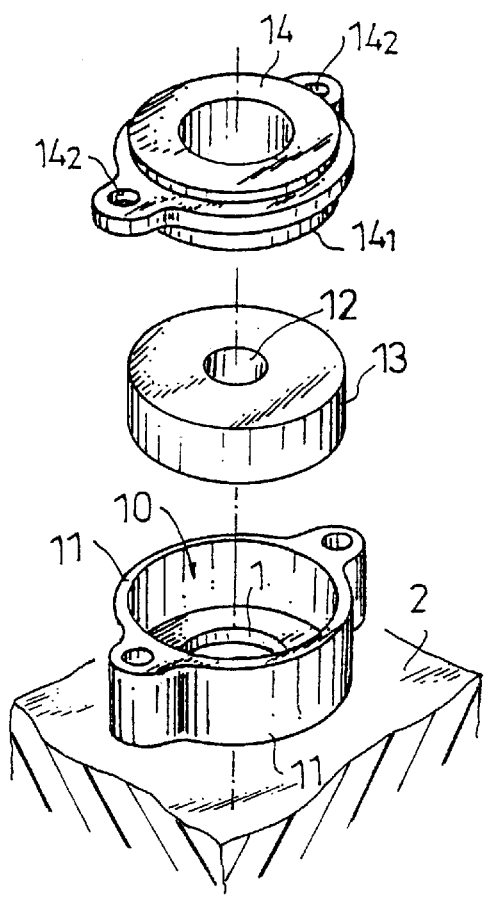
FIG. 11. is an exploded perspective view of the essential part of the closure shown in FIG. 10A.
Figure 12:
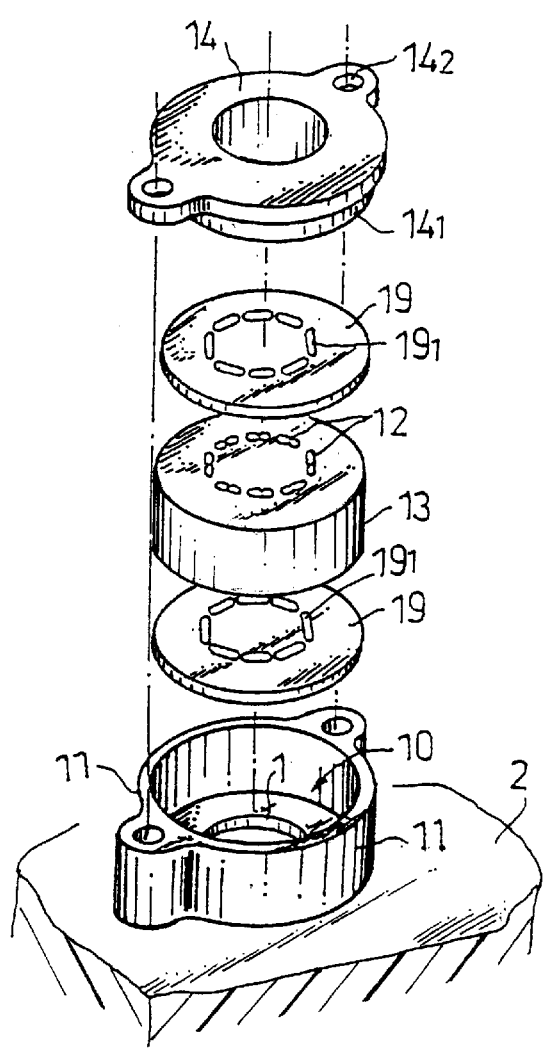
FIG. 12 is an exploded perspective view similar to FIG. 11 showing the closure, which is applied to an assembly drop cable.

Under circumstances that the internal and external pressures are high, various kinds of cable bushes 13 made of hard rubber of 30 to 60 Hs in hardness are provided and the spacer or spacers 19 are interposedly arranged between a selected one of the cable bushes 13 and the cable seal cap 14 and/or between the selected cable bush 13 and a bottom wall of the pocket 10 as shown in FIG. 10B to control a degree of compression, to thereby effectively address to the cable of a small diameter. Incorporation of the spacer and the number of spacers incorporated may be determined depending on both internal and external pressures of the closure.

Figure 15:
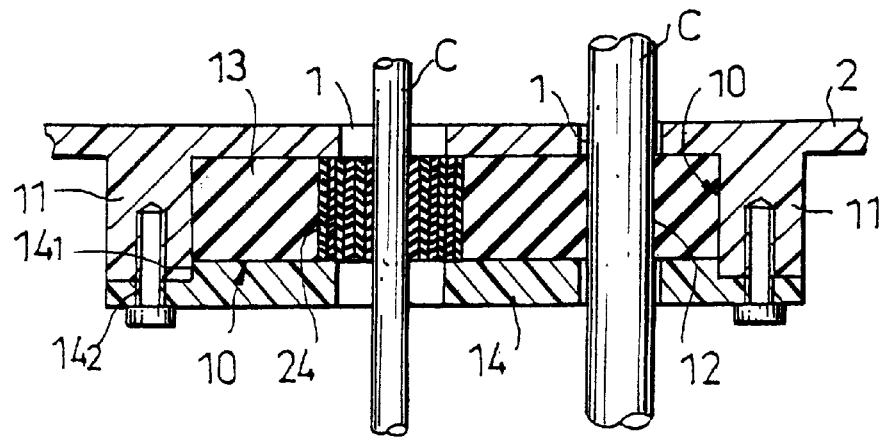
FIG. 15 is a fragmentary vertical sectional view showing another embodiment of a closure for a cable connection according to the present invention.

A situation that a cable bush 13 is formed with a plurality of through-holes 12 and cables C different in diameter from each other are respectively inserted through adjacent ones of the cable insertion holes 12 would be considered. Adjustment of compression of the cable bush 13 is often insufficient to accommodate to such a situation. In this instance, the seal tape 24 is preferably wound on the cable C of a smaller diameter, to thereby enhance sealing between the cable C and the through-hole 12, as shown in FIG. 15.

Figure 13A:
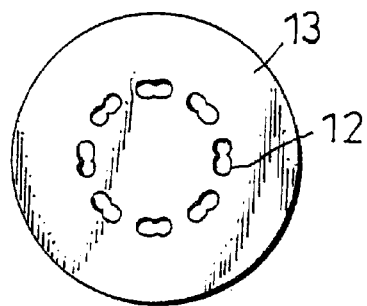
FIG. 13A is a plan view showing a seal member incorporated in the closure shown in FIG. 12.
Figure 13B:
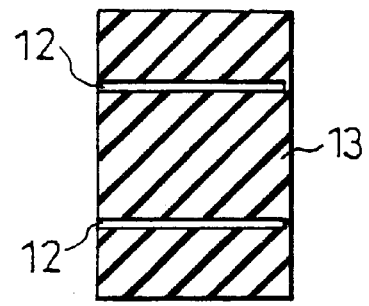
FIG. 13B is a vertical sectional view of the seal member shown in FIG. 13A.
Figure 14A:
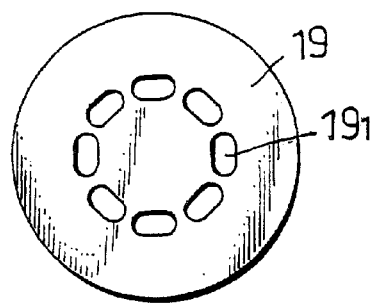
FIG. 14A is a plan view showing a spacer incorporated in the closure shown in FIG. 12.
Figure 14B:
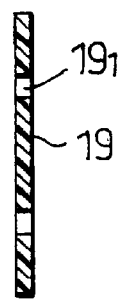
FIG. 14B is a vertical sectional view of the spacer shown in FIG. 14A.

The cable bushes 13 incorporated in the closure of the illustrated embodiment each may be constructed in such a manner as shown in FIGS. 13A and 13B. The closure having the cable bushes 13 of FIGS. 13A and 13B incorporated therein is adapted to be received in a hand hole or a so-called finger-hole and applied to a branch connection of a branch drop cable to a plurality of lead-in optical fiber cables. In the illustrated embodiment, eight such lead-in optical fiber cables can be arranged. Branch or lead-in of the cable through each of the through-holes 1 is carried out after removal of the cap 21.

The cable bushes 13 each of which is adapted to be press-fitted in a respective one of the cable insertion holes 1 is integrally made of a thermoplastic rubber-like composition of 0 to 60 Hs in hardness such as rubber, elastomer, gel or the like. The composition may be, for example, 40 to 90 in penetration ($10^{-1}$ mm), 1500 to 2000% in elongation and 0.5 to 1.5 kgf/cm$^2$ in tensile stress. The through-hole 12 of the cylindrical cable bush 13 may be formed to have any suitable shape such as a circular shape, a gourd-like shape, a dumb-bell shape, an oblong circle, an elliptic shape or the like. At least one such through-hole 12 may be formed in the cable bush 13. The thus-constructed cable bush 13 is abutted against and compressed by the cable seal cap 14 fitted in each of the cylindrical pockets 10 of the base member 2, resulting in providing the closure with improved liquid-tight seal.

The cable seal caps 14 having a plate-like shape are each formed with mounting holes 142. The cable seal cap 14 is fixedly fitted in each of the cylindrical pockets 10 by means of screws to bring the cable bush 13 into elastic contact with the cable C inserted through the cable insertion hole 1. The cable seal caps 14 may each be provided on an outer periphery thereof with at least one pair of tongue-like mounting elements in a manner to project therefrom and the mounting holes may be formed in the mounting elements.

In a fiber connection operation using the closure of the illustrated embodiment, the cover member 3 of the closure is opened to remove a sheath of a multi-fiber cable, to thereby expose optical fibers. Then, the exposed fibers are connected to optical fibers of another cable by means of connectors and then excess fibers of the optical fibers are received together with the connectors in each of the fiber storage units 4. Thus, the closure of the illustrated embodiment facilitates a connection operation of the fibers while visually observing the operation.

Then, after the operation of receiving the excess fibers in the fiber storage units 4 is completed, the fiber storage units 4 are stacked up on each other and then fixed through the support 26 in the closure. Thus, the illustrated embodiment permits the fiber connection sections to be individually received in the connector receiving sections 42, to thereby effectively prevent instantaneous transmission failure.

The other end or upper end of the cover member 3, as shown in FIGS. 1 to 5, is closed and formed with a substantially hemispherical shape and the one end thereof, as described above, is open, resulting in the cover member 3 being in the form of top-closed cylinder. Such a cover member 3 may be made of resin by injection molding. The cover member 3 may be integrally formed on an outer periphery thereof with a plurality of non-slip strip-like projections as required.

The fiber storage units 4 are formed to have a configuration in conformity to an inner diameter of the cover member 3 and to store optical fibers therein with increased density and efficiency. Such construction permits the fiber storage unit 4 to be commonly applied to any splice by a cassette while minimizing bending of an optical fiber from a cable insertion section, to thereby render a splice fixing position common to splices. Also, such construction increases a degree of freedom of operation due to one-way wiring, to thereby ensure safety in handling and facilitate both identification of the fibers and taking out of any desired fiber.

The cover member 3 is kept elastically mounted on the base member 2 by means of the band 9 through the gasket 8 arranged in the whole circumference thereof between the base member 2 and the cover member 3, resulting in intrusion of water or the like into the closure being effectively prevented.

Re-connection between the cables may be carried out in a manner reverse to the above-described procedure. More particularly, first the cover member 3 is detached from the base member 2 and then the fiber storage units 4 are removed from the base member 2 as required. Such detachment and removal may be accomplished without using any tool. Thus, it will be noted that the re-connection of the cables and resealing of the closure may be facilitated.

Thus, the closure of the illustrated embodiment facilitates access to an interior of the closure during operation of connection between the cables and the like, so that the connection operation may be readily carried out in a short period of time.

As can be seen from the foregoing, the closure for a cable connection according to the present invention is so constructed that the base member is formed at the portion of the outer surface thereof positioned around each of the cable insertion holes with the cylindrical pocket, in which the cable bush made of a rubber-like elastic material and formed with the through-hole communicating with a respective one of the through-holes is fittedly arranged, and the cable seal cap which has the raised surface for abutting against the cable bush is releasably fitted in the cylindrical pocket to bring the cable bush into elastic contact with a cable. Such construction permits the closure to be commonly applied to various cable connection procedures such as a branch connection from a main cable, a drop connection from the main cable and the like and ensure satisfactory cable connection irrespective of a diameter of the cable. Also, the present invention provides the closure with increased tightness or sealing characteristics, resulting in facilitating a cable connection operation and preventing intrusion of water or the like into the closure.

Also, the present invention permits a cable mounting operation to be carried out by merely operating the single base plate, so that efficiency of the operation may be improved. Further, the present invention eliminates use of any adhesive seal material or compound for the seal portion, to thereby facilitate assembling and disassembling of the closure. Furthermore, it increases a degree of freedom in arrangement of the closure in a hand hole or a so-called finger-hole and provides the closure with increased safety, tightness and reliability. Moreover, it increases a degree of freedom in a cable connection operation due to one-way wiring, ensures safety in handling of the closure, facilitates identification of the fibers and facilitates removal and resealing of any desired fibers.

While a preferred embodiment of the present invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A closure for a cable connection comprising:

a closure casing including a base member formed with a plurality of cable insertion holes, a cap-like cover member constructed so as to be open at one end thereof and fitted on said base member through said one end thereof, and a fastener for detachably fastening said cover member to said base member;

at least one fiber storage unit provided in said closure casing for receiving fiber connection sections and excess fibers therein;

said base member being formed at a portion of an outer surface thereof positioned around each of said cable insertion holes with a cylindrical pocket;

a cable bush which is made of a rubber-like elastic material and formed with a through-hole communicating with a respective one of said cable insertion holes and which is fittedly arranged in said cylinder pocket; and a cable seal cap having a raised surface for abutting against said cable bush and releasably fitted in said cylindrical pocket to bring said cable bush into elastic contact with a cable.

2. A closure for a cable connection as defined in claim 1, wherein said cable bush is formed of a thermoplastic rubber-like composition, selected from rubber and elastomer, of 0 to 60 Hs in hardness.

3. A closure for a cable connection as defined in claim 2, wherein said cable bush is disposed along with a spacer formed with a cable insertion aperture while said spacer is interposedly provided on at least one of opposite surfaces of said cable bush.

4. A closure for a cable connection as defined in claim 1, wherein said cable insertion holes of said base member are each closed with a cap through a connection of a small thickness removably connected between said base member and said cap; and said cap is provided with a fit connection recess which permits a removal operation member to be fittedly inserted therein so as to remove said cap to open said cable insertion hole.

5. A closure for a cable connection as defined in claim 2, wherein said cable insertion holes of said base member are each closed with a cap through a connection of a small thickness removably connected between said base member and said cap; and said cap is provided with a fit connection recess which permits a removal operation member to be fittedly inserted therein so as to remove said cap to open said cable insertion hole.

6. A closure for a cable connection as defined in claim 3, wherein said cable insertion holes of said base member are each closed with a cap through a connection of a small thickness removably connected between said base member and said cap; and said cap is provided with a fit connection recess which permits a removal operation member to be fittedly inserted therein so as to remove said cap to open said cable insertion hole.

7. A closure for a cable connection as defined in claim 1, wherein said cable bush is fitted in said cylindrical pocket while keeping the cable inserted through said through-hole; and a seal tape of 0 to 30 Hs in hardness is multiplexly wound on a portion of the cable fitted in said through-hole.

8. A closure for a cable connection as defined in claim 2, wherein said cable bush is fitted in said cylindrical pocket while keeping the cable inserted through said through-hole; and a seal tape of 0 to 30 Hs in hardness is multiplexly wound on a portion of the cable fitted in said through-hole.

9. A closure for a cable connection as defined in claim 3, wherein said cable bush is fitted in said cylindrical pocket while keeping the cable inserted through said through-hole; and a seal tape of 0 to 30 Hs in hardness is multiplexly wound on a portion of the cable fitted in said through-hole.

10. A closure for a cable connection as defined in claim 1, wherein said pocket is formed by an outer cylindrical wall provided on an outer surface of said base member so as to outwardly project therefrom.

11. A closure for a cable connection as defined in claim 2, wherein said pocket is formed of an outer cylindrical wall provided on an outer surface of said base member so as to outwardly project therefrom.

12. A closure for a cable connection as defined in claim 3, wherein said pocket is formed of an outer cylindrical wall provided on an outer surface of said base member so as to outwardly project therefrom.

13. A closure for a cable connection as defined in claim 1, wherein said cable bush is formed with a plurality of the through-holes.

14. A closure for a cable connection as defined in claim 2, wherein said cable bush is formed with a plurality of the through-holes.

15. A closure for a cable connection as defined in claim 3, wherein said cable bush is formed with a plurality of the through-holes.

16. A closure for a cable connection comprising:

a closure casing including a base member formed with a plurality of cable insertion holes, a cap-like cover member constructed so as to be open at one end thereof and fitted on said base member through said one end thereof, and a fastener for detachably fastening said cover member to said base member; and at least one fiber storage unit provided in said closure casing for receiving fiber connection sections and excess fibers therein;

said cable insertion holes of said base member being each provided therein with a cable seal means;

said cable insertion holes of said base member being each closed with a cap through a connection of a small thickness removably connected between said base member and said cap;

said cap being provided with an engagement with which a removal operation member is permitted to be engaged so as to remove said cap to open said cable insertion hole.

17. A closure for a cable connection as defined in claim 16, wherein said cable seal means includes a cylindrical pocket formed on an outer surface of said base member to be positioned around each of said cable insertion holes, a cable bush made of a rubber-like elastic material fitted in said cylindrical pocket and formed with a through-hole communicating with a respective one of said cable insertion holes, and a cable seal cap having a raised surface abutting against said cable bush; and said cable seal cap is detachably fitted in said cylindrical pocket to bring said cable bush into elastic contact with a cable.

18. A closure for a cable connection as defined in claim 16, wherein said engagement is a recess which is formed in said cap and which permits the removable operation member to be fittedly inserted therein.

19. A closure for a cable connection as defined in claim 17, wherein said engagement is a recess which is formed in said cap and which permits the removable operation member to be fittedly inserted therein.

* * * * *

UNITED STATES PATENT AND TRADEMARK OFFICE
CERTIFICATE OF CORRECTION

PATENT NO. : 6,021,246
DATED : February 1, 2000
INVENTOR(S) : Koshiyama et al.

It is certified that error appears in the above-identified patent and that said Letters Patent is hereby corrected as shown below:

Column 7,
Line 7, "142" should read -- "14$_2$" --.

Signed and Sealed this

Twenty-fifth Day of June, 2002

Attest:

JAMES E. ROGAN
Attesting Officer        Director of the United States Patent and Trademark Office